July 30, 1940.  F. TUPTA  2,209,863
AIRPLANE WING
Filed Dec. 22, 1937  3 Sheets-Sheet 1
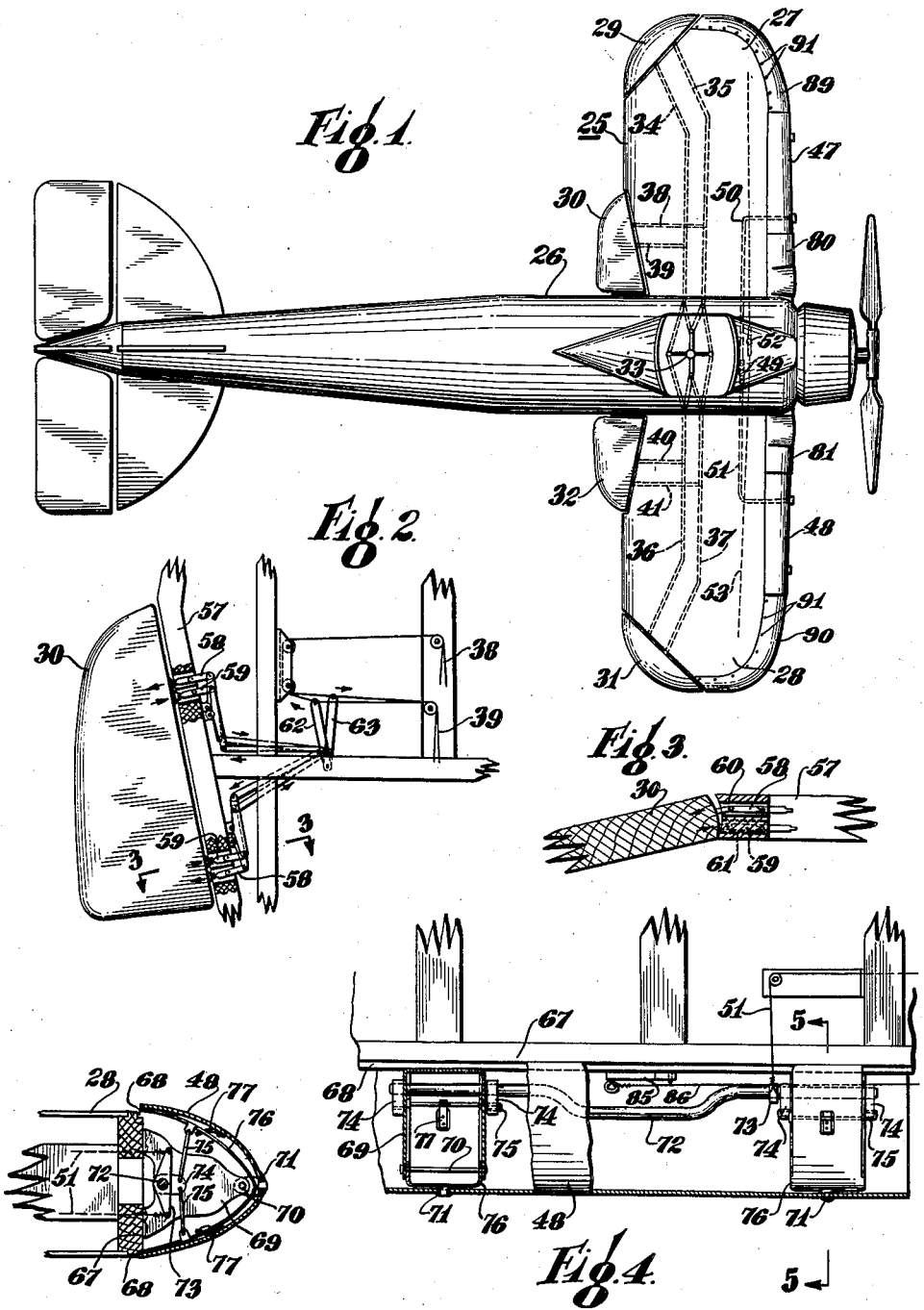
INVENTOR.
Frank Tupta.
BY Hoodling and Krost.
ATTORNEY.

July 30, 1940.  F. TUPTA  2,209,863
AIRPLANE WING
Filed Dec. 22, 1937  3 Sheets-Sheet 2
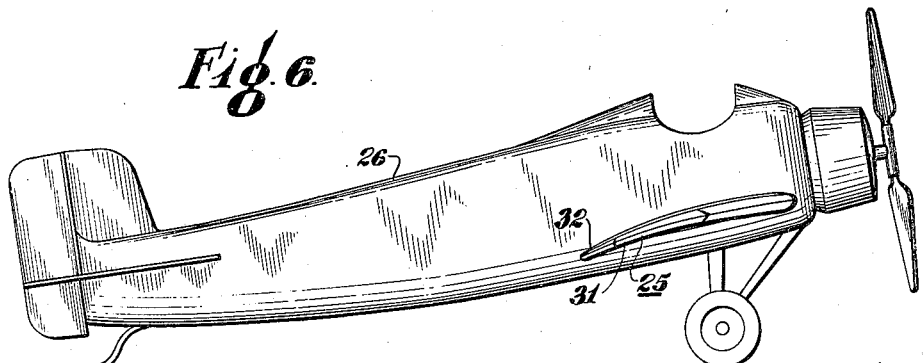
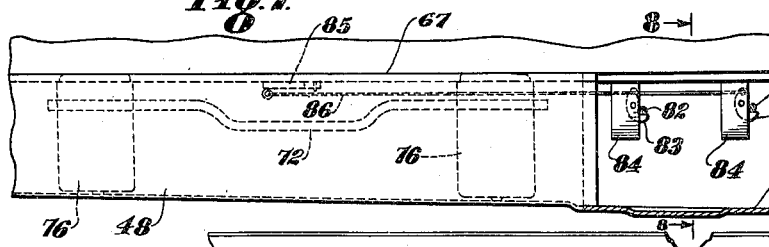
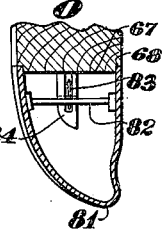
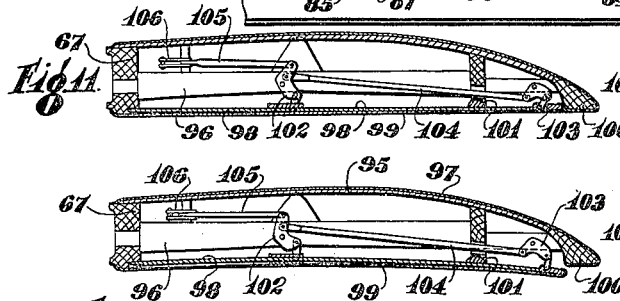
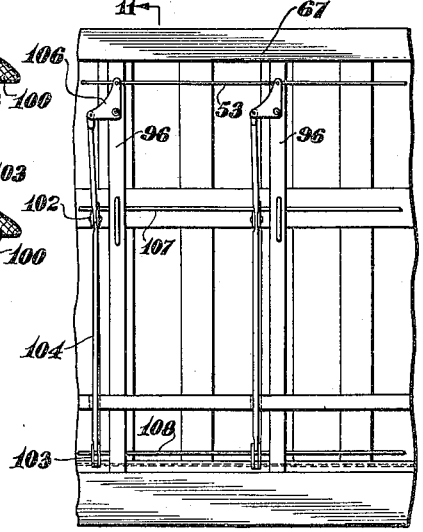
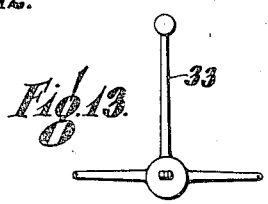
INVENTOR.
Frank Tupta.
BY Woodling and Krost.
ATTORNEY.

July 30, 1940.　　　　　F. TUPTA　　　　　2,209,863
AIRPLANE WING
Filed Dec. 22, 1937　　　3 Sheets-Sheet 3
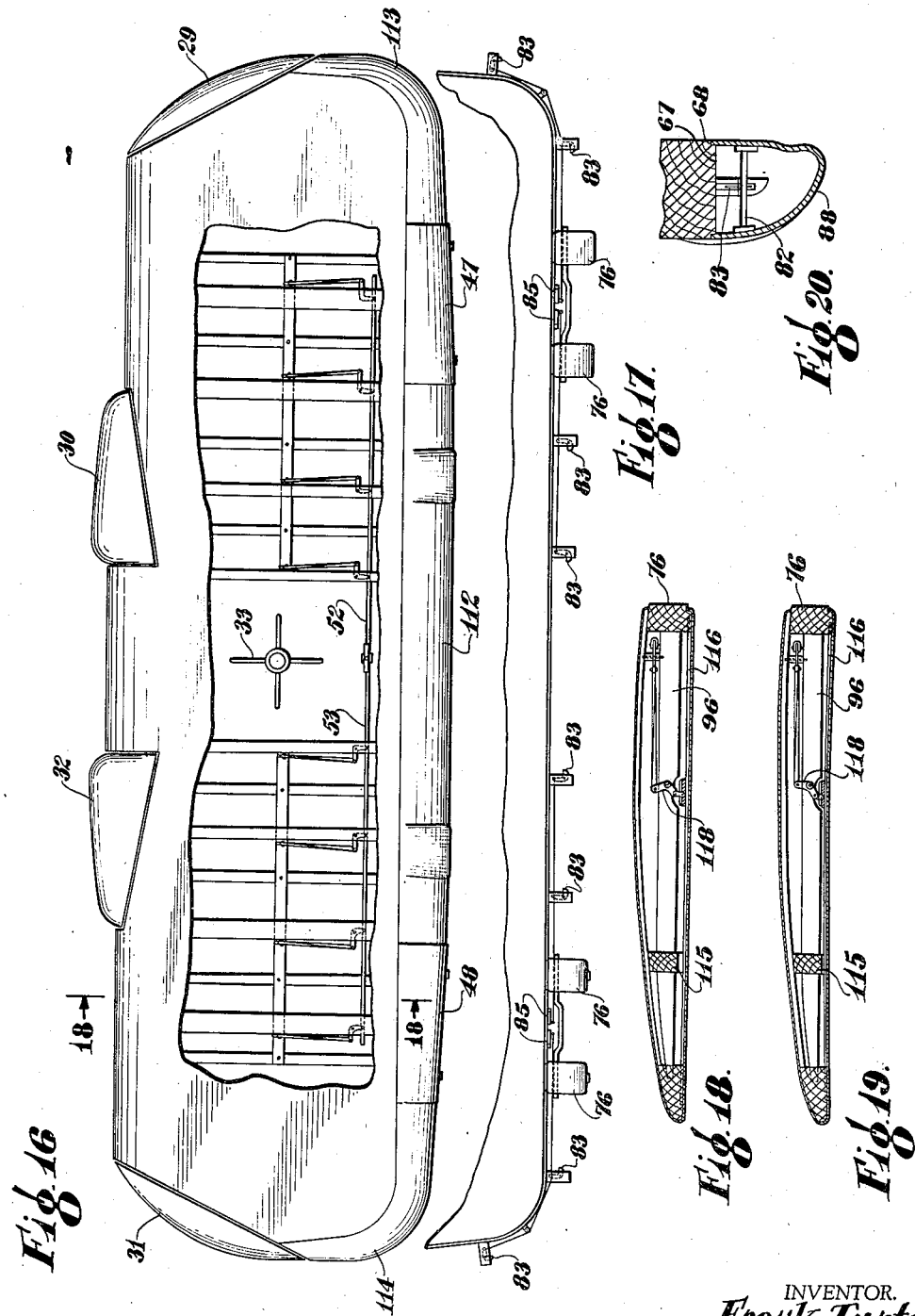
INVENTOR.
Frank Tupta.
BY Stoodling and Krost.
ATTORNEY.

Patented July 30, 1940

2,209,863

UNITED STATES PATENT OFFICE 2,209,863

AIRPLANE WING

Frank Tupta, Cleveland, Ohio

Application December 22, 1937, Serial No. 181,098

4 Claims. (Cl. 244—42)

My invention relates generally to aviation and more particularly to a new type of wing for airplanes and means for controlling the same.

An object of my invention is to provide for controlling an airplane by means of which greater efficiency and safety in operation my be obtained.

Another object of my invention is to enable the airplane to gain in speed against a strong wind and to obtain buoyancy at a lower speed than has heretofore been accomplished.

Another object of my invention is the provision of a construction of devices on an airplane wing to insure faster, safer, and more convenient travel of the airplane through the air.

Another object of my invention is the provision of movable nose devices along the front edge of the airplane wing so that the removable nose devices may be of any shape desired depending upon the air requirements.

Another object of my invention is to provide for reducing the gummy air stream on the wing in straight flight, for increasing the lifting power when the airplane is rising and for increasing the gliding power when the plane is landing.

Another object of my invention is the provision of mounting pivotally arranged floaters along the front edge of the airplane wing and thereby establish high pressure speed floaters.

Another object of my invention is the provision of establishing a vacuum on the upper or lower surfaces of the airplane wing by means of high pressure speed floaters mounted along the forward edge of the airplane wing.

Another object of my invention is the provision of a wing having a flexible side surface to increase the speed, protect the plane when landing and increase the lifting power and to prevent the airplane from going into a nose dive.

Another object of my invention is the provision of a flexible side bottom for the airplane wing to give better control of the airplane than theretofore obtained in prior devices.

Another object of my invention is to provide for controlling the flexible bottom side of an airplane wing by means of a manually operated control lever.

Another object of my invention is the provision of a balanced pair of pivoted ailerons on the tip of the airplane wing and a pair of pivoted ailerons on the rear of the airplane wing.

Another object of my invention is the provision of control means for operating the ailerons either separately or in unison and thus give greater stearing power to the plane, acting in cooperation with movable floaters placed on the forward edge of the wing and a flexible bottom of the wing to preserve the balance of the plane and to prevent the occurrence of a tail spin.

Other objects and a fuller understanding may be had by referring to the following description and claims, taken in conjunction with the accompanying drawings, in which like parts are designated by like reference characters and in which:

Figure 1 is a plan view of an airplane embodying the features of my improved wing;

Figure 2 is a fragmentary view of a portion of the wing embodying the features of my invention and showing the control means for actuating a movable pivoted aileron on the rear of the wing;

Figure 3 is a fragmentary and enlarged partly cross-sectional view taken along the line 3—3 of Figure 2;

Figure 4 is a fragmentary and enlarged partly cross sectional view of movable floaters mounted along the forward edge of my improved wing;

Figure 5 is a cross-sectional view of Figure 4 taken along the line 5—5 thereof;

Figure 6 is a side elevational view of an airplane embodying the features of my improved wing;

Figure 7 is a fragmentary and enlarged plan view showing movable floaters and movable nose devices mounted along the forward edge of my improved wing;

Figure 8 is a cross-sectional view taken along the line 8—8 of Figure 7;

Figure 9 is a fragmentary front view of the front edge of my improved wing showing the locking means for movably locking the front nose devices to the front edge of my improved wing;

Figure 10 is a fragmentary view of my improved wing with the top removed to show the actuating means for flexing the bottom of my improved wing;

Figure 11 is a cross-sectional view taken along the line 11—11 of Figure 10, showing the flexible bottom in its novel position;

Figure 12 is a view similar to Figure 11 but showing the flexible bottom of the wing in a flexed position;

Figure 13 shows an enlarged view of the control lever for actuating the movable ailerons on the tip of the wing and the movable ailerons on the rear edge of the wing;

Figure 14 is an enlarged view of the control lever for actuating the movable floaters positioned along the front edge of my improved wing;

Figure 15 is an enlarged view of the control lever for actuating the flexible bottom of my improved wing;

Figure 16 is a plan view of my entire improved wing embodying a modified arrangement for the flexing of the bottom of my wing;

Figure 17 is a fragmentary view of the forward edge of the wing shown in Figure 16, with the movable floaters and the movable nose devices removed;

Figure 18 is a cross-sectional view of the wing, taken along the line 18—18 of Figure 16 showing the flexible bottom of the wing in its normal position;

Figure 19 is a view similar to 18 showing the flexible bottom of the wing flexed upwardly; and Figure 20 is a fragmentary view similar to Figure 8 showing a nose device having a different shape than that shown in Figure 8.

With reference to Figure 1 of the drawings, my improved wing is indicated generally by the reference character 25 and in this embodiment, is constructed of two wing sections 27 and 28 which are suitably mounted to opposite sides of the fuselage 26 of the airplane. As illustrated, the tip of the wings are provided with pivotally mounted ailerons 29 and 31 and the rear edge of the wings on opposite sides of the fuselage 26 are provided with pivotally mounted ailerons 30 and 32. A control lever 33 is arranged to actuate the pivotally mounted ailerons 29 and 31 mounted upon the tip of the wing and the pivotally mounted ailerons 30 and 32 mounted along the rear edge of the wing on opposite sides of the fuselage 26. The control means between the lever 33 and the pivotally mounted ailerons is shown diagrammatically by the dotted lines. For example, the control means indicated by the pair of dotted lines 34 and 35 is arranged to control the movement of the pivotally mounted aileron 29; the control means indicated by the pair of dotted lines 36 and 37 is arranged to control the pivotal movement of the aileron 31; the control means indicated by the pair of dotted lines 38 and 39 is arranged to control the pivotal movement of the aileron 30; and the control means indicated by the pair of dotted lines 40 and 41 is arranged to control the movement of the aileron 32. The control means indicated by the dotted lines and governed by the control lever 33 is such that when the control lever 33 is in one position, the ailerons 29 and 30 may be inclined upwardly and the ailerons 31 and 32 may be inclined downwardly, and when the control lever 33 is in a second position, the ailerons 29 and 30 may be inclined downwardly and the ailerons 31 and 32 may be inclined upwardly, and when the control lever 33 is in a third position, all of the ailerons 29, 30, 31 and 32 may be inclined upwardly, and when the control lever 33 is in a fourth position, all of the ailerons 29, 30, 31 and 32 may be inclined downwardly. Therefore, the ailerons 29, 30, 31 and 32 may be independently operated or they may be operated in unison to provide proper control for the airplane.

The pivotal hinge means for mounting the ailerons to the airplane wing and for controlling the movement of the ailerons are all alike as shown with reference to the aileron 30 in Figures 2 and 3. The pivotal hinge means is effected by means of link hinges 58 and 59 which are slidably mounted in suitable sleeves 60 and 61 provided in the rear aileron supporting member 57. The link hinges 58 and 59 are controlled by a system of rocker arms and levers through the movement of the levers 62 and 63 which are in turn controlled by the pair of cables 38 and 39, as clearly shown in Figure 2. Thus, for example, when the lever 62 is actuated to the left as shown by the arrow line, the link hinges 59 are drawn to the right as indicated by the arrow lines, and when, for example, the lever 63 is actuated to the right as indicated by the arrow line, the link hinges 58 are actuated to the left as indicated by the arrow lines, and the cooperative movement of the hinges 58 and 59 cause the pivotally mounted aileron 30 to be inclined downwardly as shown in Figure 3. When the levers 62 and 63 are actuated to their reverse positions, the aileron 30 is inclined upwardly to a position opposite to that shown in Figure 3. Therefore, the actuation of the control lever 33 and the pair of cables 38 and 39 may govern the pivotal movement of the aileron 30. The control of the other ailerons 29, 31 and 32 and the construction of the link hinges are the same as that shown with reference to the aileron 30, as shown in Figures 2 and 3.

To provide better control for the airplane, I provide for mounting on opposite sides of the fuselage and along the front edge of the wing sections 27 and 28 movable floaters shown generally in Figure 1 by the reference characters 47 and 48. These floaters 47 and 48 reduce the gummy air on the wing in straight flight, increase the lifting power when the plane is rising and increase the gliding power when landing. A fragmentary and enlarged view of the floater 48 is shown in Figures 4 and 5, but it is understood that the construction of the floater 47 is the same as that shown in Figures 4 and 5. The floaters 47 and 48 are controlled by the control lever 49 through means of suitable cable connections indicated by the pair of cables 50 and 51 respectively. The description will be directed to the floater 48 but it is to be understood that the description applies equally well to the floater 47.

The floater 48 comprises an arcuate upper surface and an arcuate lower surface and the rear edges of the upper and lower surfaces are wider than the width of the forward edge of the wing. The forward end of the floater 48 is connected to a pivoted structure 76 by means of a suitable nut 71 threadably engaging a threaded member extending through the forward end of the floater 48. The pivoted structure 76 is pivotally mounted at its forward end by means of a pivoted connection 70 to a bracket 69. The rear end of the bracket 69 is suitably connected to the forward substantially flat face of the wing 28. The floater extends for a substantial distance along the front edge of the wing and thus, the pivoted structures 76 and the brackets 69 are spaced apart as shown in Figure 4. A shaft 72 extends between the two spaced brackets 69 and is actuated by a rocker arm 73 governed by the pair of cables 51. Mounted on opposite sides of the spaced brackets 69 and connected to the shaft 72 are actuating members 74 to which are attached connecting links 75 which actuate the pivoted structure 76 about the pivoted connection 70. The inside of the floater 48 is provided with projecting guide members 77 which suitably fit in openings in the pivoted structure 76 so that when the threaded nut 71 is turned on tight, the floater 48 moves pivotally upon the pivoted means 70. By the arrangement shown in Figure 5 when the rock shaft 72 is actuated in a counter-clockwise direction, the top surface of the floater is moved away from the upper edge of the wing and the lower surface of the floater fits into a shoulder 68 in the front supporting member 67. This is the position shown in Figure 5. When the rock shaft 72 is actuated in a clockwise direction, the top edge of the floater fits in the shoulder 68 upon the top edge of the wing and the lower surface of the floater is moved away from the lower surface of the wing and is opposite to that shown, in Figure 5. Therefore, the floater 48 may be moved relative to the forward edge of the wing to cause a vacuum either above or below the wing surface to provide better control of the airplane. The floater may be referred to as high pressure speed floaters and they provide for reducing the gummy air streams on the wing in straight flight and for increasing the lifting power when rising and the gliding power when landing. The floaters 47 and 48 may be of any desired contour to accommodate air requirements.

Positioned between the floaters 47 and 48 and the fuselage 26 are removable nose devices 80 and 81. These nose devices may have any desired shape to meet air requirements and a series of them may be provided, such, for example, as the shape shown in Figure 8 and the shape shown in Figure 20 and may be interchangeable to meet air requirements. The following description will be directed to the removable nose piece 81, but it is understood that the description applies to the removable nose piece 80. The rear edge of the removable nose piece 81 is arranged to fit into the shoulders 68 provided along the front edge of the supporting member 67 of the wing. Inside of the nose piece 81 is a cross bar 82 suitably provided at its end with connections to the inside of the nose piece 81. Projecting from the front edge supporting member 67 of the wing are a plurality of projecting supports 84 which pivotally carry latch hooks 83, see Figures 7, 8, and 9. The latch hooks 83 are arranged to engage the latch rods 82 so that the removable nose pieces 81 may be readily locked in place along the front edge of the wing. As illustrated in Figures 7 and 9, the pivoted latch hooks 83 are actuated by a cable 86 which runs along the forward edge of the wing and is actuated at its left-hand end by an over-center lever 84 pivotally connected to the front edge supporting member 67 under the floater 48. Therefore, when mounting the removable nose piece 81, it is only necessary to actuate the over-center lever 85 in a counter-clockwise direction and loosen the slack upon the cable 86, after which the removable nose piece 80 may be arranged in position. After the removable nose piece is arranged in position, the over-center lever 85 is actuated in a clockwise direction and draws the cable 86 tight and holds the pivotally mounted latch hooks 83 in their locked position as shown in Figure 7. A stop pin 87 is arranged to prevent the over-center lever 85 from turning clockwise beyond a certain point as shown in Figure 9. Inasmuch as the lever 85 is an over-center lever, it remains in its over-center position until the person actuates it in a counter-clockwise direction to relieve the tension on the cable 86. After the removable nose piece 81 is locked in position the floater 48 may be mounted on the pivoted structure 76 by means of the nut 71. Thus, by means of the locking arrangement, nose devices of any suitable shape, such as shown by reference character 88 in Figure 20 or the reference character 81 in Figure 8, may be applied to the front edge of my wing. An enlarged view of the control lever 49 for actuating the floaters 47 and 48 is shown in Figure 14 and is arranged to have a forward and reverse position giving the two relative positions of the floater 48 as shown in Figure 5.

Around the forward end of the wing section 27 and 28, I provide for mounting movable front nose devices 89 and 90, as shown in Figure 1. These removable nose devices may be mounted by means of screws indicated by the reference character 91. Therefore, the entire front forward edge of my improved wing is arranged to have removable devices which may be interchanged to accommodate air conditions.

The arrangement of the flexible bottom surface of my wing is shown in Figures 10, 11 and 12, and as illustrated at spaced intervals throughout the longitudinal length of the wing, there are provided a plurality of main supporting means 96, top supporting members 95, and bottom supporting members 98. The front end of the supporting members are suitably connected to the front edge supporting member 67. Supported upon the top supporting members 95 is a top surface means indicated by the reference character 97. Supported on the bottom supporting member 98 is bottom surface means 99. The top and bottom surface means 97 and 99 may be of any suitable construction as now employed in airplane construction.

The bottom supporting member 98 and the bottom surface means 99 is flexible as shown in Figure 12, and thus the forward ends of the bottom supporting members 98 are slidably mounted in the front edge supporting member 76 and the rearward ends of the bottom supporting member 98 are fulcrumed at 101. As illustrated, I provide for central pivot levers 102 and rearward pivot levers 103 for constraining the flexing of the bottom surface of the wing. The central pivot levers 102 and the rearward pivot levers 103 are interconnected by rods 104, and the central pivot levers 102 are connected to rods 105, which rods in turn are connected to bell cranks 106, which are actuated by the longitudinal control rod 53 from the control lever 52, see Figure 1. A large view of the control lever 52 is shown in Figure 15 and it is arranged such that when the longitudinal control rod 53 in Figure 10 is actuated to the right, the central pivot levers 102 lift the central portion of the flexible bottom wing and the rear pivot levers 103 force the rear end of the bottom surface of the wing downwardly as shown in Figure 12. During the flexing of the bottom surface of the wing, the bottom supporting members 98 fulcrum about the fulcrum means 100 and the forward ends of the bottom supporting members 98 slide in the grooves in the front edge supporting member 67. The central pivot levers 102 and the rear pivot levers 103 may be pivotally mounted on longitudinal pivot rods 107 and 108 respectively, which extend longitudinally of the wing. The rear longitudinal supporting member for the wing is indicated by the reference character 100 and extends longitudinal of the rear edge of the wing, and the rear edge of the flexible bottom is arranged to substantially coincide therewith when in the unflexed position as shown in Figure 11. In the flexed position as shown in Figure 12, the rearward edge of the flexible bottom extends below the longitudinal rear supporting member 100. The control of the flexible bottom is arranged to give increased lifting power and in cooperation with the other control means preserves the balance of the plane and prevents the occurrence of a tail spin. In Figure 16, I show a complete wing embodying the features of my invention and in this embodiment, the floaters 47 and 48 are the same as that described with reference to the previous views of the invention. Intermediate the two floaters 47 and 48 is a central removable nose device 112 and upon opposite ends of the wings and along the forward edge are two removable nose devices 113 and 114. These removable nose devices 112, 113 and 114 are arranged to be locked on to the forward edge of the wing by means of the latch hooks 83 controlled by over-center lever 85 substantially in the same manner as that previously described with reference to the other views of my invention. Therefore, in this complete wing shown in 16, the entire forward edge may be provided with removable nose devices of various shapes in order to meet the requirements of the air. The Figure 17 shows the front edge of my improved wing in 16, with the floaters 47 and 48 removed, together with the removable nose devices 112, 113, and 114.

My improved wing shown in Figure 16 is arranged to have a flexible bottom between the longitudinal members 115 and the forward longitudinal member 76. The portion of the wing between the longitudinal member 115 and the rear of the wing is arranged to be fixed. Central levers 118 pivoted to the main longitudinal means 96 is arranged to lift the flexible bottom upwardly as the central levers 118 are actuated in a clockwise direction such as shown in Figure 19, and the forward ends of the bottom members 116 slide in the grooves in the front edge supporting member 76 to allow for the flexing. The amount of the flexing of the bottom surface of the wing shown in Figure 19 is not so pronounced as that shown in Figure 12 but the purpose of the flexing of the bottom surface of the wing is the same. Therefore, in my improved wing, I have shown means for giving complete operation of the airplane including the actuation of the ailerons 29, 30, 31, and 32, the floaters 47 and 48, and the flexible bottom as shown in Figures 12 and 19. Therefore, my new wing accomplishes a large number of objects which render an airplane embodying my wing construction more efficient and less dangerous to operate. The control levers 49 and 52 are arranged to be set at any fixed position by biasing the levers away from their quadrants and inserting a projection on the levers in the registered openings of the quadrants. Therefore, the lever 49 for the floaters may be set to hold the floaters in the "up," "down" or "neutral" positions. The lever 52 may be set to give any degree of flexing to the flexible bottom.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. In an airplane wing, in combination, a plurality of spaced main supporting means extending from the front edge to the rear edge of the wing, a plurality of spaced top supporting members extending from the front edge to the rear edge of the wing, longitudinal front and rear edge supporting members connected with the ends of the main supporting means and the top supporting members, top surface means provided on the top supporting members and constituting the top surface of the wing, a plurality of spaced bottom supporting members extending from the front edge to the rear edge of the wing, the front end of the said bottom supporting members engaging the front longitudinal supporting member, a fulcrum member extending longitudinally of the wing and spaced from the rear longitudinal supporting member, said fulcrum member engaging the main supporting means, the rearward portion of the bottom members pivotally engaging the fulcrum member, bottom surface means provided on the bottom supporting members and constituting the bottom surface of the wing, means connected between the main supporting means and the bottom supporting members for moving the bottom supporting members relative to the main supporting members and causing the bottom supporting members to rock on the fulcrum member, and control means governing the connecting means.

2. In an airplane wing construction, in combination, a front edge supporting member, a rear edge supporting member, a top wing surface connected to said front and rear edge supporting members, a bottom supporting member slidably engaging said front edge supporting member, a bottom wing surface connected to said bottom supporting member, main supporting means engaging said front edge supporting member and said rear edge supporting member and positioned between said top wing surface and said bottom wing surface, a first pivot lever attached to said main supporting means near the lateral center of the said wing and adapted to engage said bottom supporting member, a second pivot lever attached to said main supporting means near the rear edge supporting member and adapted to engage said bottom supporting member, and control means for actuating said first and second pivot levers to flex the bottom supporting member and alter the shape of the bottom surface of the said wing, said slidable engagement between said bottom supporting member and said front edge supporting member causing said bottom supporting member to slide with respect to said front edge supporting member as said bottom supporting member is flexed.

3. In an airplane wing, in combination, a plurality of spaced main supporting means extending laterally through the wing, a plurality of lateral bottom members, longitudinal front and rear edge supporting members engaging said main supporting means and said bottom members, surface means provided on the lateral bottom members and constituting the bottom surface of the wing, a fulcrum member for said lateral bottom member, a first pivot lever mounted on said main supporting means and engaging said lateral bottom member, a second pivot lever mounted on said main supporting means and engaging said lateral bottom member, and control means for actuating said first and second pivot levers to flex said lateral bottom member about said fulcrum point to alter the bottom surface of said wing.

4. In an airplane wing construction, in combination, a front edge member, a rear edge member, a top wing surface connected to said front and rear edge members, a bottom wing surface comprising a central portion and a front end portion and a rear end portion, said front end portion being connected to said front edge member, internal supporting means positioned between said top and bottom wing surfaces and engaging said front and rear edge members, a first pivot lever attached to said internal support means and adapted to actuate the central portion of said bottom wing surface, a second pivot lever attached to said internal support means and adapted to actuate the rear end portion of the bottom wing surface and control means for actuating said first and second pivot levers together to pull the central portion of the bottom wing surface toward the top wing surface and push the rear end portion of the bottom wing surface away from the top wing surface.

FRANK TUPTA.